Figure 1:
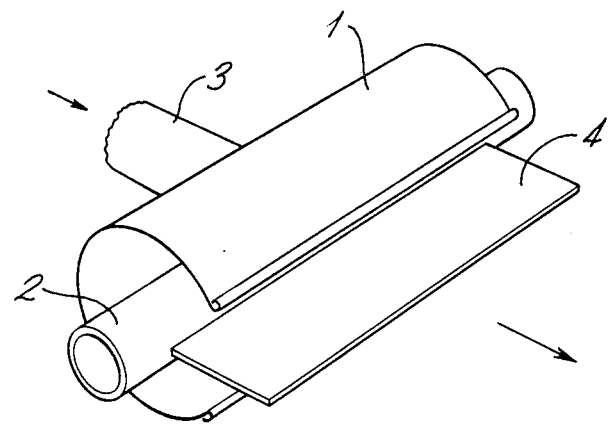

United States Patent [19]

Hutchinson et al.

[11] 4,272,732
[45] Jun. 9, 1981

[54] FIELD EMISSION LASER WITH RADIAL CURRENT PATHS

[75] Inventors: Marcus H. R. Hutchinson, London; Daniel J. Bradley, Harrow, both of England

[73] Assignee: National Research Development Corporation, London, England

[21] Appl. No.: 30,936

[22] Filed: Apr. 17, 1979

[30] Foreign Application Priority Data

Apr. 27, 1978 [GB] United Kingdom ............... 16769/78

[51] Int. Cl.³ .............................................. H01S 3/05
[52] U.S. Cl. ........................... 331/94.5 P; 331/94.5 G
[58] Field of Search ................... 331/94.5 G, 94.5 PE, 331/94.5 P, 94.5 D

[56] References Cited

U.S. PATENT DOCUMENTS

| 3,497,827 | 2/1970 | Smith et al. | 331/94.5 PE |
| 3,518,570 | 6/1970 | Ditrich | 331/94.5 PE |
| 3,537,030 | 10/1970 | Dorbel et al. | 331/94.5 PE |
| 3,983,508 | 9/1976 | Bradley et al. | 331/94.5 G |

Primary Examiner—William L. Sikes
Assistant Examiner—Leon Scott, Jr.
Attorney, Agent, or Firm—Cushman, Darby & Cushman

[57] ABSTRACT

A laser comprises a cell containing xenon at high pressure and has its walls pervious to high-velocity electrons. The cell is of cylindrical shape and constitutes the anode of a field-emission diode. The cathode of the diode is in the shape of an incomplete cylinder surrounding the anode. Electrons emitted from the cathode thus travel radially inwardly and penetrate the anode walls to excite lasing action. The external electrical connection to the anode is of planar configuration and extends radially outwardly from the anode.

2 Claims, 2 Drawing Figures

FIELD EMISSION LASER WITH RADIAL CURRENT PATHS

This invention relates to lasers.

In U.S. Pat. No. 3,983,508 there is described and claimed a laser comprising a field emission diode of annular configuration defined between an outer cathode and an inner anode coaxial therewith, which anode is in the form of a hollow container for a high pressure gaseous lasing medium, the walls of the container being at least partly pervious to electrons emitted from the cathode, mirrors at opposite ends of the container to enable resonance to occur therein at the lasing frequency, and means for abstracting energy at the lasing frequency from the container.

In the above-described arrangement the return current of the diode is carried along the inner anode container back to earth. This current flow produces a coaxial magnetic field within the diode which in turn interacts with the electrons travelling radially across the diode and causes a "pinching" effect. This may adversely affect the uniformity of pumping of the gas and alters the impedance of the diode. The significance of this effect increases with increasing diode current. It is therefore important to overcome this pinching effect in large scale systems or in lasers in which there is a very high density of diode current.

According to the invention in a laser as set forth above an external electrical connection to the said anode extends radially outwardly from the anode.

Preferably said connector is a planar connector positioned in a plane radially of the diode.

Figure 2:
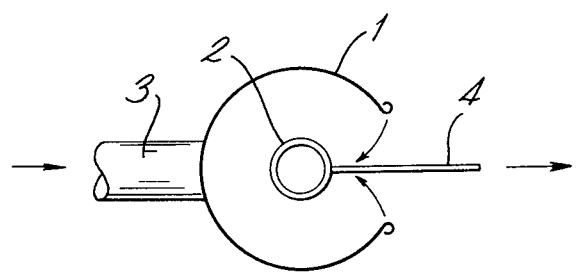

In order that the invention may be more fully understood reference will now be made to the drawing accompanying this specification in which:

FIG. 1 is a diagrammatic perspective view of an embodiment of the invention, and FIG. 2 is a cross-section of the embodiment shown in FIG. 1.

Referring now to FIGS. 1 and 2 there is shown therein in diagrammatic form a laser constructed as described in U.S. Pat. No. 3,983,508. For simplicity only the basic elements comprising the outer annular cathode 1 and the inner anode container 2 are illustrated. An external electrical connection 3 is made to the outer cathode and another external connection 4 is made to the inner anode. The anode connection 4 does not extend coaxially of the anode but is radial thereto and in order to accommodate the connection cathode 1 does not constitute a full cylinder but subtends less than 360°. Only a single external connection 4 is required to anode 2.

With the above arrangement the magnetic field lines caused by current flow in the external anode connection 4 do not act to pinch the electron flow between cathode 1 and anode 2.

We claim:

1. In a laser comprising a field emission diode of annular configuration defined between an outer cathode and an inner anode coaxial therewith, which anode is in the form of a hollow container for a high pressure gaseous lasing medium, the walls of the container being at least partly pervious to electrons emitted from the cathode, mirrors at opposite ends of the container to enable resonance to occur therein at the lasing frequency, and means for abstracting energy at the lasing frequency from the container, the improvement in which the said cathode is in the shape of an incomplete cylinder subtending an angle of less than 360 degrees at its axis and in which there is an external electrical connection to the said anode extending radially outwardly from the anode and through the gap formed by the said incomplete cylinder.

2. The laser as claimed in claim 1 in which the said external electrical connection comprises an electrical conductor of planar configuration.

* * * * *